US010013640B1

(12) United States Patent
Angelova et al.

(10) Patent No.: US 10,013,640 B1
(45) Date of Patent: Jul. 3, 2018

(54) OBJECT RECOGNITION FROM VIDEOS USING RECURRENT NEURAL NETWORKS

(71) Applicant: Google LLC, Mountain View, CA (US)

(72) Inventors: Anelia Angelova, Sunnyvale, CA (US); Ivan Bogun, Melbourne, FL (US)

(73) Assignee: Google LLC, Mountain View, CA (US)

( * ) Notice: Subject to any disclaimer, the term of this patent is extended or adjusted under 35 U.S.C. 154(b) by 119 days.

(21) Appl. No.: 14/976,147

(22) Filed: Dec. 21, 2015

(51) Int. Cl.
*G06K 9/62* (2006.01)

(52) U.S. Cl.
CPC ......... *G06K 9/6231* (2013.01); *G06K 9/6292* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,873,813 | B2* | 10/2014 | Tadayon | G06K 9/00 382/118 |
| 9,015,093 | B1* | 4/2015 | Commons | G01C 21/3602 701/23 |
| 9,430,697 | B1* | 8/2016 | Iliadis | G06K 9/00288 |
| 9,626,577 | B1* | 4/2017 | Yu | G06K 9/18 |
| 2014/0201126 | A1 | 7/2014 | Zadeh et al. | |
| 2015/0363688 | A1* | 12/2015 | Gao | G06N 3/04 706/27 |
| 2016/0322055 | A1* | 11/2016 | Sainath | G10L 15/16 |
| 2016/0328644 | A1* | 11/2016 | Lin | G06N 3/08 |
| 2016/0364419 | A1* | 12/2016 | Stanton | G06F 17/3002 |
| 2017/0011281 | A1* | 1/2017 | Dijkman | G06K 9/66 |
| 2017/0011288 | A1* | 1/2017 | Brothers | G06N 3/04 |
| 2017/0103752 | A1* | 4/2017 | Senior | G10L 15/16 |
| 2017/0124432 | A1* | 5/2017 | Chen | G06F 17/2785 |
| 2017/0127016 | A1* | 5/2017 | Yu | G06K 9/00711 |
| 2017/0132472 | A1* | 5/2017 | Tao | G06K 9/00758 |
| 2017/0150235 | A1* | 5/2017 | Mei | H04N 21/8405 |
| 2017/0255832 | A1* | 9/2017 | Jones | G06K 9/00771 |

OTHER PUBLICATIONS

Bogun et al., "Object Recognition from Short Videos for Robotic Perception," arXiv:1509.01602v1 [cs.CV], Sep. 2015, 9 pages.
Bosch et al., "Image Classification using Random Forests and Ferns," IEEE 11th International Conference on Computer Vision, 2007, ICCV 2007, Oct. 2007, pp. 1-8.
Collet et al., "Object Recognition and Full Pose Registration from a Single Image for Robotic Manipulation," Proceedings of the IEEE International Conference on Robotics and Automation (ICRA), May 2009, pp. 48-55.
Deng et al., "ImageNet: A Large-Scale Hierarchical Image Database," IEEE Conference on Computer Vision and Pattern Recognition, 2009, CVPR 2009, Jun. 2009, pp. 248-255.

(Continued)

*Primary Examiner* — Anand Bhatnagar
(74) *Attorney, Agent, or Firm* — Fish & Richardson P.C.

(57) ABSTRACT

Methods, systems, and apparatus, including computer programs encoded on computer storage media, for identifying an object from a video. One of the methods includes obtaining multiple frames from a video, where each frame of the multiple frames depicts an object to be recognized, and processing, using an object recognition model, the multiple frames to generate data that represents a classification of the object to be recognized.

30 Claims, 5 Drawing Sheets

(56) References Cited

OTHER PUBLICATIONS

Fernandez et al., "Phoneme recognition in TIMIT with BLSTM-CTC," arXiv:0804.3269v1 [cs.CL], Apr. 2008, pp. 1-8.
Gers et al., "Learning to Forget: Continual Prediction with LSTM," Artificial Neural Networks, 1999. ICANN 99. Ninth International Conference on (Conf. Publ. No. 470), vol. 2, Sep. 1999, pp. 850-855.
Girshick et al., "Rich feature hierarchies for accurate object detection and semantic segmentation," Tech report (v5), arXiv:1311.2524v5 [cs.CV], Oct. 2014, pp. 1-21.
Gould et al., "Integrating Visual and Range Data for Robotic Object Detection," Workshop on Multi-camera and Multi-modal Sensor Fusion Algorithms and Applications—M2SFA2 2008, Oct. 2008, 12 pages.
Graves and Jaitly, "Towards End-to-End Speech Recognition with Recurrent Neural Networks," Proceedings of the 31$^{st}$ International Conference on Machine Learning, 2014, pp. 1764-1772.
Graves and Schmidhuber, "Framewise Phoneme Classification with Bidirectional LSTM and Other Neural Network Architectures," Neural Networks, 18(5-6):602-610, Jun.-Jul. 2005.
Graves and Schmidhuber, "Offline Handwriting Recognition with Multidimensional Recurrent Neural Networks," Advances in Neural Information Processing Systems 21 (NIPS 2008), 8 pages.
Graves et al., "A Novel Connectionist System for Unconstrained Handwriting Recognition," IEEE Transactions on Pattern Analysis and Machine Intelligence, 31(5):855-868, May 2008.
Graves et al., "Speech Recognition With Deep Recurrent Neural Networks," arXiv:1303.5778v1 [cs.NE], Mar. 2013, 5 pages.
Greff et al., "LSTM: A Search Space Odyssey," arXiv:1503.04069v1 [cs.NE], Mar. 2015, 18 pages.
Hochreiter and Schmidhuber, "Long Short-Term Memory," Neural Computation 9, pp. 1735-1780, 1997.
Jia et al., "Robotic Object Detection: Learning to Improve the Classifiers Using Sparse Graphs for Path Planning," Proceedings of the Twenty-Second International Joint Conference on Artificial Intelligence, 22(3):2072-2078, 2011.
Karpathy et al., "Large-scale Video Classification with Convolutional Neural Networks," 2014 IEEE Conference on Computer Vision and Pattern Recognition (CVPR), Jun. 2014, pp. 1725-1732.
Krizhevsky et al., "ImageNet Classification with Deep Convolutional Neural Networks," In Advances in neural information processing systems, 2012, pp. 1097-1105.
Lai et al., "A Large-Scale Hierarchical Multi-View RGB-D Object Dataset," 2011 IEEE International Conference on Robotics and Automation (ICRA), May 2011, pp. 1817-1824.
Lenz et al., "Deep Learning for Detecting Robotic Grasps," arXiv:1301.3592v6 [cs.LG], Aug. 2014, 17 pages.
Ng et al., "Beyond Short Snippets: Deep Networks for Video Classification," arXiv:1503.08909v2 [cs.CV], Apr. 2015, pp. 1-9.
Pillai and Leonard, "Monocular SLAM Supported Object Recognition," arXiv:1506.01732v1 [cs.RO], Jun. 2015, 9 pages.
Redmon and Angelova, RealTime Grasp Detection Using Convolutional Neural Networks, arXiv:1412.3128v2 [cs.RO], Feb. 2015, 7 pages.
Schuster and Paliwal, "Bidirectional Recurrent Neural Networks," IEEE Transactions on Signal Processing, 45(11):2673-2681, Nov. 1997.
Schwarz et al., "RGB-D Object Recognition and Pose Estimation based on Pre-trained Convolutional Neural Network Features," IEEE International Conference on Robotics and Automation (ICRA), May 2015, pp. 1329-1335.
Shi et al., "Convolutional LSTM Network: A Machine Learning Approach for Precipitation Nowcasting," arXiv:1506.04214v2 [cs.CV], Sep. 2015, pp. 1-12.
Socher et al., "Convolutional-Recursive Deep Learning for 3D Object Classification," Advances in Neural Information Processing Systems 25, 2012, 9 pages.
Sutskever et al., "Sequence to Sequence Learning with Neural Networks," In Advances in neural information processing systems, Sep. 2014, pp. 3104-3112.
Vinyals et al., "Show and Tell: A Neural Image Caption Generator," arXiv:1411.4555v2 [cs.CV], Apr. 2015, pp. 1-9.
Zuo et al., "Convolutional Recurrent Neural Networks: Learning Spatial Dependencies for Image Representation," Proceedings of the IEEE Conference on Computer Vision and Pattern Recognition Workshops, 2015, pp. 18-26.

\* cited by examiner

OBJECT RECOGNITION FROM VIDEOS USING RECURRENT NEURAL NETWORKS

BACKGROUND

This specification generally relates to using neural networks for object recognition. Some neural networks are recurrent neural networks that include one or more Long Short-Term Memory (LSTM) layers. Some LSTM layers are convolutional LSTM layers.

SUMMARY

According to one innovative aspect of the subject matter described in this specification, motion information extracted from video frames can be used as an additional cue for object recognition, and recurrent convolutional neural network based on convolutional LSTM layers may be used to extract this motion information. In general, object recognition from short videos (e.g., a video consists of up to five video frames) is a common problem in several applications. Convolutional LSTM models are capable of learning motion dependencies in video frames to improve the recognition accuracy. For example, in robotics perception, a camera-mounted robotic arm manipulator may record a small video as it approaches an object, and convolutional LSTM models may be used for recognizing the object. As another example, when data is acquired by a mobile phone, a short video sequence can be taken instead of still image, and convolutional LSTM models may be used for recognizing the object.

In general, one innovative aspect of the subject matter described in this specification can be embodied in methods that include the actions of obtaining multiple frames from a video, where each frame of the multiple frames depicts an object to be recognized; and processing, using an object recognition model, the multiple frames to generate data that represents a classification of the object to be recognized.

These and other implementations can each optionally include one or more of the following features. For example, the object recognition model may be a recurrent neural network that includes a long short-term memory (LSTM) layer. The LSTM layer may include a convolutional input gate, a convolutional forget gate, a convolutional memory block, and a convolutional output gate that use convolutions to process data.

The recurrent neural network may include multiple feature extraction layers. To process the multiple frames, for each frame of the multiple frames, the frame may be processed to generate feature data that represents features of the frame using the multiple feature extraction layers. The feature data may be processed using the LSTM layer to generate an LSTM output and to update an internal state of the LSTM layer. The multiple frames may be arranged in an order according to their time of occurrence in the video. To process the multiple frames, each frame of the multiple frames may be processed using the LSTM layer in the order according to their time of occurrence in the video to generate the LSTM output and to update the internal state of the LSTM layer.

The recurrent neural network may include one or more classification layers. To process the multiple frames, the LSTM output may be processed using the one or more classification layers to generate the data that represents the classification of the object to be recognized. The classification may include a respective score for each object category in a predetermined set of object categories, the respective score for each of the object categories representing a likelihood that the object to be recognized belongs to the object category.

The recurrent neural network may include a backward LSTM layer. To process the plurality of frames, each frame of the multiple frames may be processed using the backward LSTM layer in a reversed order according to their time of occurrence in the video to generate a backward LSTM output and to update an internal state of the backward LSTM layer. The LSTM output and the backward LSTM output may be processed using the one or more classification layers to generate the data that represents the classification of the object to be recognized.

To obtain the multiple frames from the video, the multiple frames from the video may be selected based on a predetermined time interval. To obtain the multiple frames from the video, the multiple frames from the video may be selected based on a viewpoint of the object to be recognized. To obtain the multiple frames from the video, the multiple frames from the video may be selected based on a processing capability of a processor. To obtain the multiple frames from the video, the video may be obtained using a camera mounted on a robotic arm manipulator. A count of the multiple frames may be five or fewer.

Advantageous implementations may include one or more of the following features. Using multiple video frames may improve accuracy of object recognition, specifically for the application of robotic perception, where a robot may observe the object from slightly different views, or for the application of object recognition using mobile phones. Analyzing several frames of the object and integrating this information over time helps to improve the accuracy of object recognition. A convolutional LSTM model is efficient and effective in extracting local variation between video frames. Fewer parameters are required to train a convolutional LSTM model compared to a fully-connected LSTM model. A convolutional LSTM model may be applied by integrating motion frames taken at a time interval that is comparable with the computation speed of GPU, which can make the object recognition application practical. Since videos, unlike audio signals, are semantically useful regardless of the direction they are played, bidirectional convolutional LSTM models can be used to further improve the accuracy of object recognition models.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, deep neural networks (DNNs) have been established as a predominant method for object recognition. By taking advantage of large datasets and learning capacity, DNNs are able learn to recognize many object categories. In some implementations, short videos (e.g., videos having up to 5 video frames) may be used for object recognition. For example, in robotics perception, a camera-mounted robotic arm manipulator may record a short video as it approaches an object, and the video may be processed by an object recognition model to recognize the object. As another example, a mobile phone may be used to acquire a short video for object recognition. Motion information in the short videos may be used as an additional cue for object recognition. However, generalizing DNNs to work on short videos is difficult because video frames are highly correlated. Recurrent neural networks (RNNs) based on LSTMs are good for temporal modeling, and may be used as an object recognition model that uses consecutive video frames as input. Moreover, a convolutional LSTM may be used to capture local motion information. For example, when a cup rotates on a turntable, only the shape of the handle deforms, while the overall shape of the cup remains the same. To extract this local motion information, a convolutional LSTM may be used.

Figure 1:
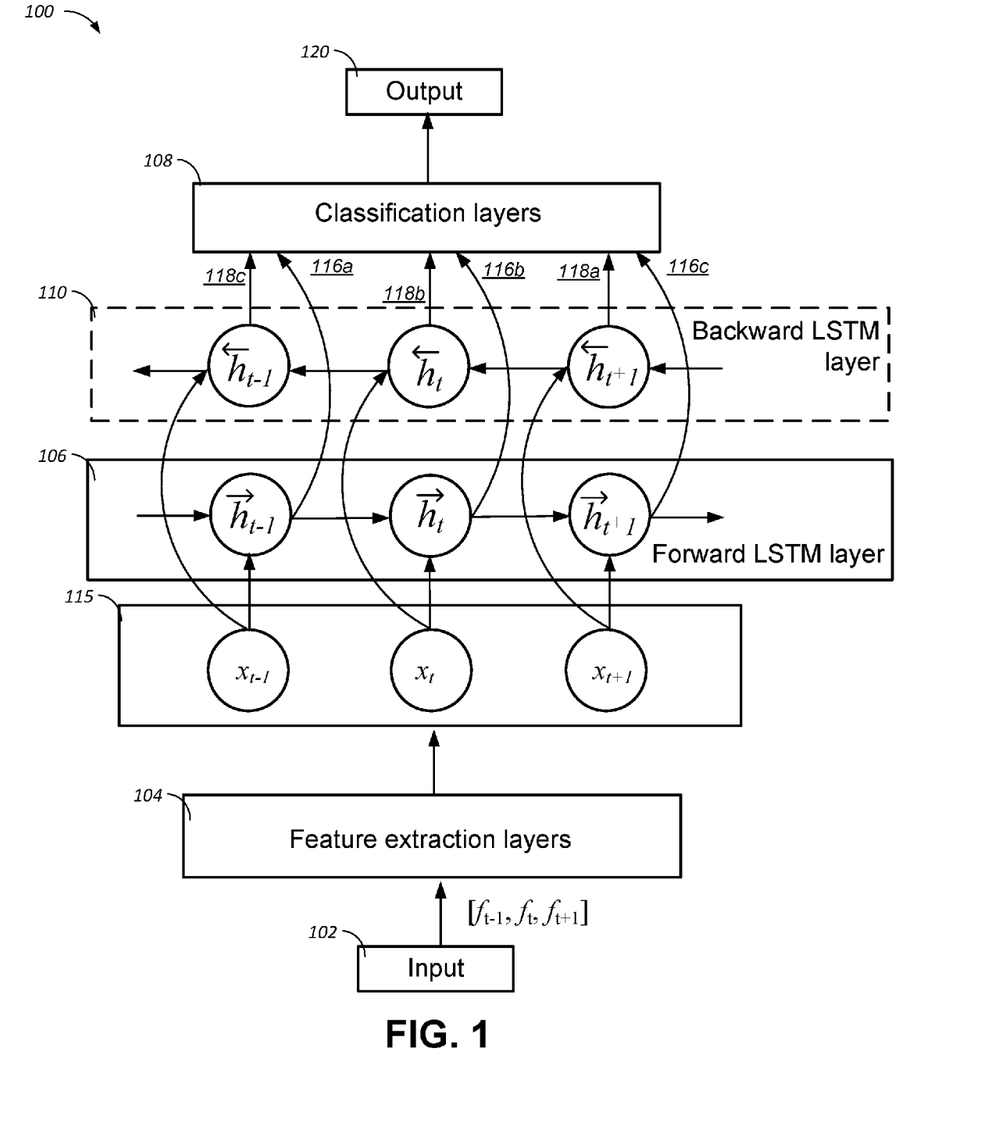
FIG. 1 is a block diagram of an example object recognition model.

FIG. 1 shows a block diagram of an example system 100 that represents an object recognition model having a convolutional LSTM layer. The system 100 processes each input in a sequence of inputs to generate an output for the sequence. Each input in the sequence may be a frame from a video, and the output generated by the system 100 may be a classification of the object to be recognized in the video. The system 100 includes feature extraction layers 104, a forward LSTM layer 106, and classification layers 108. In some implementations, the system 100 may also include a backward LSTM layer 110 that processes the sequence of inputs in a reverse order.

The feature extraction layers 104 are configured to process the input 102 to generate a sequence of feature outputs 115. Each video frame in the input 102 may be a still image that is represented by pixel values, where the images may include an object to be recognized by the system 100. In some implementations, the video frames may be selected based on a predetermined time interval. For example, the video may be 5 seconds long, and five video frames may be selected, where each video frame is 1 second apart. In some implementations, the video frames may be selected based on a viewpoint of the object to be recognized. For example, a camera may record a video capturing an object being rotated on a turntable by 360 degrees, and four video frames may be selected at corresponding viewpoints of 0 degree, 90 degrees, 180 degrees, and 270 degrees. In some implementations, the video frames may be selected based on a processing capability of a processor. For example, a GPU may be capable of analyzing a two-frame sequence at 1 second per sequence, and two video frames may be selected at 1 second apart. In some implementations, the video may be a short video. For example, a count of the video frames in a short video may be five or fewer. Here, the input 102 includes a sequence of three video frames $f_{t-1}$, $f_t$, and $f_{t+1}$ taken at time t−1, t, and t+1, respectively.

Figure 2:
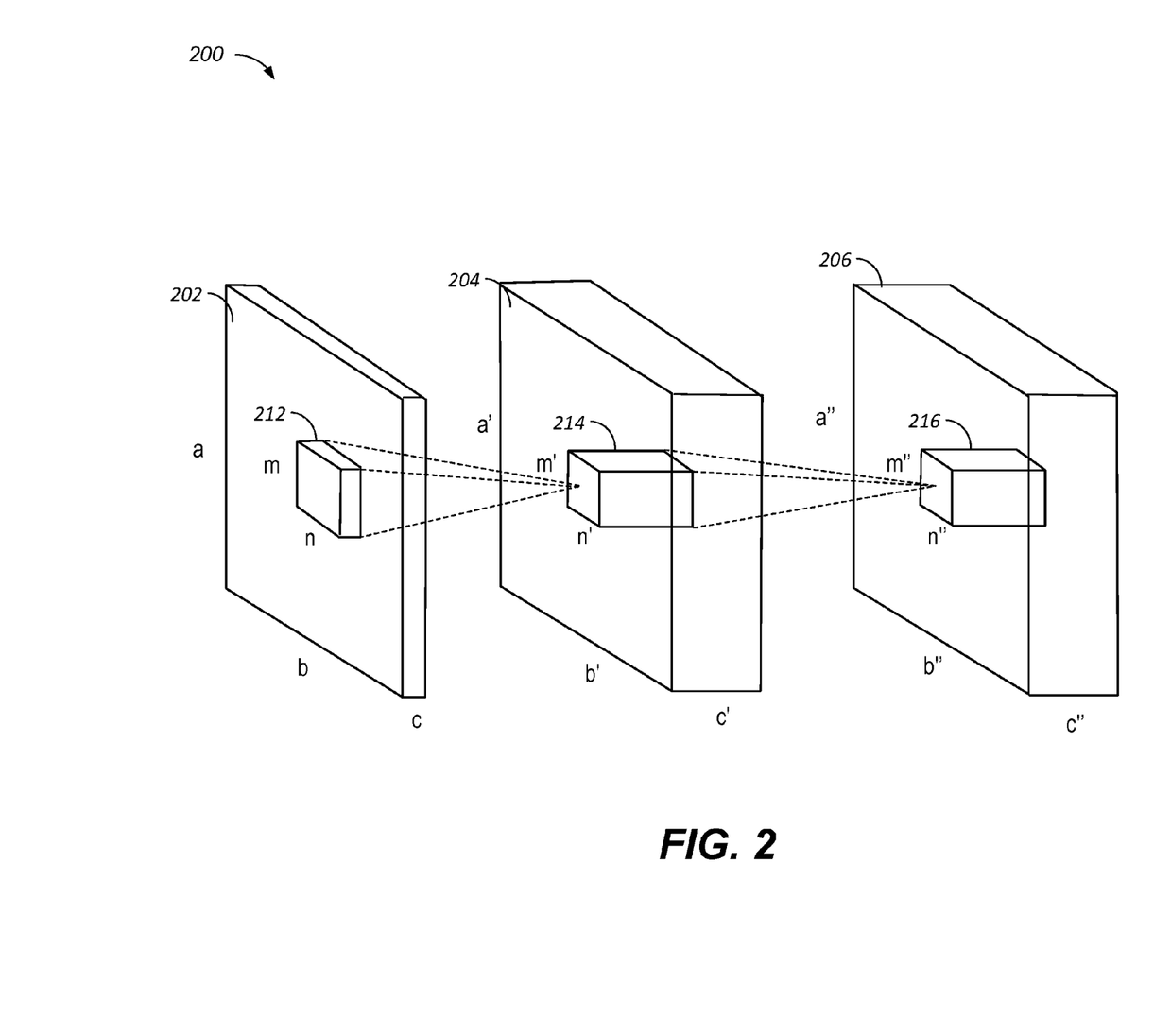
FIG. 2 is a block diagram of example feature extraction layers implemented using convolutional layers.

In some implementations, the feature extraction layers 104 may include one or more convolutional neural network (CNN) layers. Referring to FIG. 2, an example CNN architecture 200 having three CNN layers 202, 204, and 206 that may correspond to the feature extraction layers 104 is shown. Given an input image to a first CNN layer 202 having dimensions a×b×c, a filter 212 having dimensions m×r×c is convolved with the input image. The filter 212 spans across a small local image block of size (m×n×c), where m<=a, and n<=b. The filter 212 helps to model local correlations in the input image. For example, the input image may have dimensions of 224×224×3, and a filter 212 may have dimensions of 5×5×3. The convolutional operation by the first CNN layer 202 produces an output that is provided to a second CNN layer 204, where the output of the first CNN layer 202 has dimensions a'×b'×c'. A filter 214 having dimensions m'×r'×c' is convolved with the output of the first CNN layer 202. For example, the output of the first CNN layer 202 that is provided to the second CNN layer 204 may have dimensions of 224×224×128, and a filter 214 may have dimensions of 3×3×128. The convolutional operation by the second CNN layer 204 produces an output that is provided to a third CNN layer 206, where the output of the second CNN layer 204 has dimensions a"×b"×c". A filter 216 having dimensions m"×r"×c" is convolved with the output of the second CNN layer 204 that is provided to the third CNN layer 206. For example, the output of the second CNN layer 204 that is provided to the third CNN layer 206 may have dimensions of 224×224×128, and a filter 216 may have dimensions of 3×3×128.

In some implementations, the CNN architecture 200 may include one or more max-pooling layers. After performing the convolution, a max-pooling layer may help to reduce the variability of the output. For example, a max-pooling layer may partition the input image into a set of non-overlapping sub-regions, and for each sub-region, the max-pooling layer may output the maximum value. In some implementations, a stride value that is larger than 1 may be used in any one of the CNN layers 202, 204, and 206. A stride value corresponds to a distance between pixels to be processed. For example, a stride value of 2 means that after a CNN layer processes a particular pixel, the CNN layer skips a neighboring pixel for processing.

Referring back to FIG. 1, the feature extraction layers 104 processes the input 102 to generate a sequence of feature outputs 115 that is processed by a forward LSTM layer 106. The forward LSTM layer 106 is configured to process the feature output 115 in forward time steps to generate a forward LSTM output. In general, for each time step, the forward LSTM layer 106 receives the feature output 115, which represents the feature representation of the video frame for the time step. For example, for time step t−1, the feature extraction layers 104 processes the video frame $f_{t-1}$ to generate a feature output $x_{t-1}$. The forward LSTM layer 106 processes the internal LSTM state from a preceding state and the feature output $x_{t-1}$ to generate a forward LSTM output 116a and to update the internal state of the forward LSTM layer 106. For time step t, the feature extraction layers 104 processes the video frame $f_t$ to generate a feature output $x_t$. The forward LSTM layer 106 processes the forward LSTM output 116a, which represents the internal LSTM state from time step t−1, and feature output $x_t$ to generate a forward LSTM output 116b and to update the internal state of the forward LSTM layer 106. For time step t+1, the feature extraction layers 104 processes the video frame $f_{t+1}$ to generate a feature output $x_{t+1}$. The forward LSTM layer 106 processes the forward LSTM output 116b, which represents the internal LSTM state from time step t, and the feature output $x_{t+1}$ to generate a forward LSTM output 116c and to update the internal state of the forward LSTM layer 106. The forward LSTM outputs 116a, 116b, and 116c represent a change in input features in forward time steps. In some implementations, the forward LSTM layer 106 may include one or more hidden LSTM layers.

In some implementations, the sequence of output 115 may also be processed by a backward LSTM layer 110. In general, video signals, unlike audio signals, are semantically useful regardless of the direction they are played. A bidirectional convolutional LSTM model that includes the forward LSTM layer 106 and the backward LSTM layer 110 may be used to further improve the accuracy of object recognition models. The backward LSTM layer 110 is configured to process the feature output 115 in a reverse order to generate a backward LSTM output. For example, the backward LSTM layer 110 processes the internal LSTM state from a preceding state and the feature output $x_{t+1}$ to generate a backward LSTM output 118a and to update the internal state of the backward LSTM layer 110. The backward LSTM layer 110 next processes the backward LSTM output 118a, which represents the internal LSTM state from time step t+1, and feature output $x_t$ to generate a backward LSTM output 118b and to update the internal state of the backward LSTM layer 110. The backward LSTM layer 110 next processes the backward LSTM output 118b, which represents the internal LSTM state from time step t, and the feature output $x_{t-1}$ to generate a backward LSTM output 118c and to update the internal state of the backward LSTM layer 110. The backward LSTM outputs 118a, 118b, and 118c represent a change in input features in backward time steps. In some implementations, the back LSTM layer 110 may include one or more hidden LSTM layers.

Figure 3A:
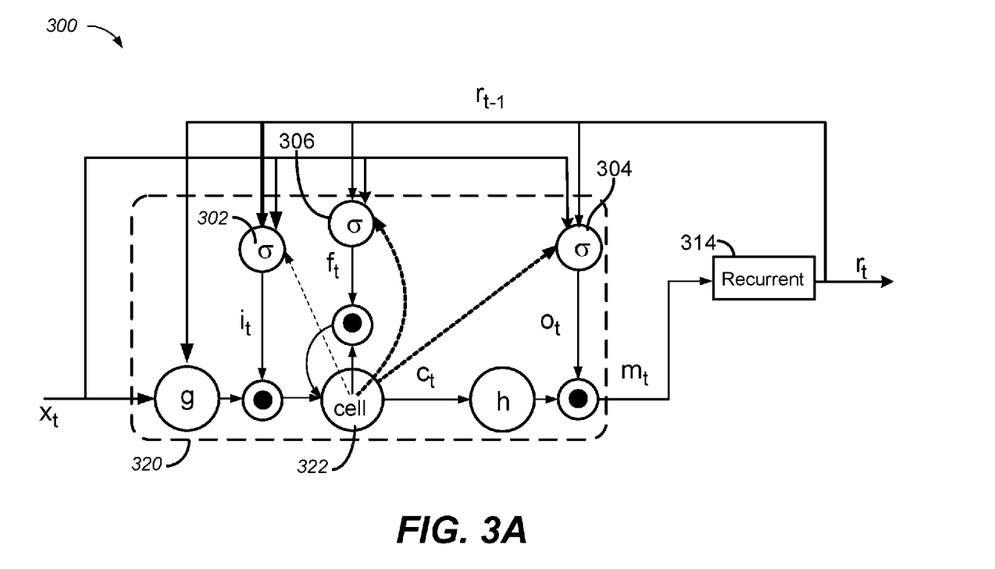
FIG. 3A is a block diagram of an example LSTM architecture.

FIG. 3A shows an example LSTM layer 300 that may correspond to the forward LSTM layer 106 or the backward LSTM layer 110. The LSTM layer 300 includes one or more LSTM memory blocks, including a LSTM memory block 320. The LSTM memory block 320 includes an LSTM memory cell 322 that receives an input $x_t$ and generates an output $m_t$ from the input and from a previous recurrent projected output $r_{t-1}$. For example, the input $x_t$ may be the feature output 115 for a video frame at time step t in a video frame sequence. The previous recurrent projected output $r_{t-1}$ is the projected output generated by the recurrent projection layer from an output $r_{t-1}$ generated by the cell at the preceding time step in the video frame sequence. That is, rather than a previous output $m_{t-1}$ of the LSTM memory cell at the preceding time step being fed back for use in calculating the output $m_t$ for the current time step, the previous recurrent projected output $r_{t-1}$ is fed back to the cell.

The LSTM memory block 320 includes an input gate 302 which controls the flow of input activations into the memory cell 322, and an output gate 304 which controls the output flow of the memory cell 322, and a forget gate 306 which scales the internal state of the memory cell 322 before adding it as input to the cell through the cell states. In some implementations, the memory cell 322 computes the output $m_t$ so that $m_t$ satisfies the following equations:

$$i_t = \sigma(W_{ix}x_t + W_{ir}r_{t-1} + W_{ic}c_{t-1} + b_i)$$

$$f_t = \sigma(W_{fx}x_t + W_{rf}r_{t-1} + W_{cf}c_{t-1} + b_f)$$

$$c_t = f_t \odot c_{t-1} + i_t \odot g(W_{cx}x_t + W_{cr}r_{t-1} + b_c)$$

$$o_t = \sigma(W_{ox}x_t + W_{or}r_{t-1} + W_{oc}c_t + b_o)$$

$$m_t = o_t \odot h(c_t)$$

where $i_t$ is the input gate activation at the current time step, $f_t$ is the forget gate activation at the current time step, of is the output gate activation at the current time step, $c_t$ is the cell activation at the current time step, $c_{t-1}$ is the cell activation at the previous time step, $\odot$ is an element-wise product operation, $\sigma$ is the gate activation function, g is the cell input activation function, h is the cell output activation function, each W term is a respective matrix of current weight values for the LSTM memory block 320, and $b_i$, $b_f$, $b_c$, and $b_o$ are bias vectors. In some implementations, the cell input activation function g is a tan h function. In some implementations, the cell output activation function h is a tan h function. In some implementations, the gate activation function $\sigma$ is a sigmoid function.

In some implementations, once the output $m_t$ has been computed, the recurrent projection layer 314 may compute a recurrent projected output $r_t$ for the current time step using the output $m_t$. The recurrent projection layer 314 receives the LSTM output $m_t$ generated by the LSTM memory block 320 and generates a recurrent projected output $r_t$ from the LSTM output in accordance with current values of a set of parameters for the recurrent projection layer 314. In some implementations, the recurrent projection layer 314 projects the LSTM output into a lower-dimensional space in accordance with the current values of the parameters of the recurrent projection layer 314. That is, the recurrent projected output $r_t$ has a lower dimensionality than the LSTM output $m_t$ received by the recurrent projection layer 314. For example, in some implementations, the LSTM output $m_t$ received by the recurrent projection layer 314 may have a dimensionality that is approximately twice the dimensionality of the recurrent projected output $r_t$, e.g. one thousand versus five hundred or two thousand versus one thousand. In some implementations, the recurrent projected output $r_t$ satisfies:

$$r_t = W_{rm}m_t,$$

where $W_{rm}$ is a matrix of current values of weights for the recurrent projection layer 314. The recurrent projected output $r_t$ can then be fed back to the memory block 320 for use in computing the output $m_{t+1}$ at the next time step in the video frame sequence.

In some implementations, a LSTM layer may be a convolutional LSTM layer, where each of the input gate 302, the output gate 304, the forget gate 306, and the memory cell 322 is convolutional. In general, not all motion information in sequences of frames is useful when recognizing objects. For example, when a cup rotates on a turntable, only the shape of the handle deforms, while the overall shape of the cup remains the same. A convolutional LSTM layer accounts for the situation in which the relevant motion is local. A convolutional LSTM layer is implemented using one or more convolutional layers instead of fully connected layers. Since each gate in the LSTM is convolutional, the recurrent network is capable of acting upon local motion from the video which is specific to each object.

Figure 3B:
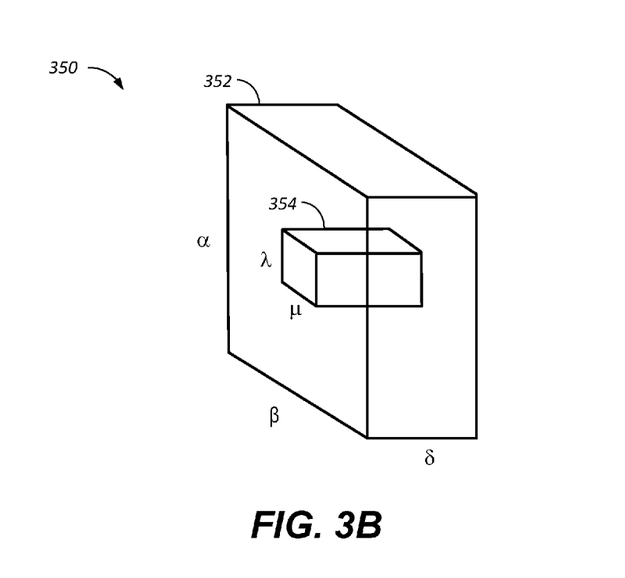
FIG. 3B is a block diagram of an example convolutional gate.

FIG. 3B shows a block diagram of an example convolutional gate 350, where it is implemented using a convolutional layer 352 that is configured to receive an input having dimensions α×β×δ. A filter 354 having dimensions λ×μ×δ is convolved with the input to generate an output. For example, the convolutional layer 352 may be configured to receive an input image having dimensions of 224×224×256, and the filter 354 may have dimensions of 5×5×256. In some implementations, each of the input gate 302, the output gate 304, the forget gate 306, and the memory cell 322 may have a filter with the same dimensions. In some other implementations, each of the input gate 302, the output gate 304, the forget gate 306, and the memory cell 322 may have a filter with the different dimensions. In some implementations, a stride value that is larger than 1 may be used in any one of the input gate 302, the output gate 304, the forget gate 306, and the memory cell 322.

Referring back to FIG. 1, the outputs 116a, 116b, and 116c of the forward LSTM layer 106, and optionally the outputs 118a, 118b, and 118c of the backward LSTM layer 110, may be passed to classification layers 108. In general, the classification layers 108 are configured to process the sequence of outputs from the LSTM layers 108 to generate output 120. For example, the object recognition model may be trained such that the classification layers store the received LSTM outputs until the forward LSTM layer 106 has processed all of the frames in the sequence and has generated all of the LSTM outputs, before generating the output 120 representing a set of scores. In some implementations, the classification layer 108 may include a concatenation layer. The concatenation layer is configured to concatenate LSTM outputs from a LSTM layer. For example, the concatenation layer may concatenate the outputs 116a, 116b, and 116c of the forward LSTM layer 106, and the outputs 118a, 118b, and 118c of the backward LSTM layer 110 into a single vector.

In some implementations, the classification layers 108 may include one or more fully-connected DNN layers. In general, the fully-connected DNN layers are appropriate for producing a higher-order feature representation that is more easily separable into the different classes for discrimination. In some implementations, each fully connected DNN layer may have a specific number of hidden units. For example, each fully connected DNN layers may have 1024 hidden units.

In some implementations, the classification layers 108 may include a softmax layer. In general, the softmax layer is configured to output a respective score for each object category in a predetermined set of object categories, where the respective score for each of the object categories representing a likelihood that the object to be recognized belongs to the object. For example, the softmax layer may generate posterior probabilities P(object|X), each representing a likelihood of a respective object given the current set of input data, X.

In some implementations, the outputs 116a, 116b, and 116c of the forward LSTM layer 106, and optionally the outputs 118a, 118b, and 118c of the backward LSTM layer 110, may be passed to the concatenation layer. The output of the concatenation layer may be passed to the one or more fully-connected DNN layers. The output of the fully-connected DNN layers may be passed to the softmax layer to generate output 120.

Figure 4:
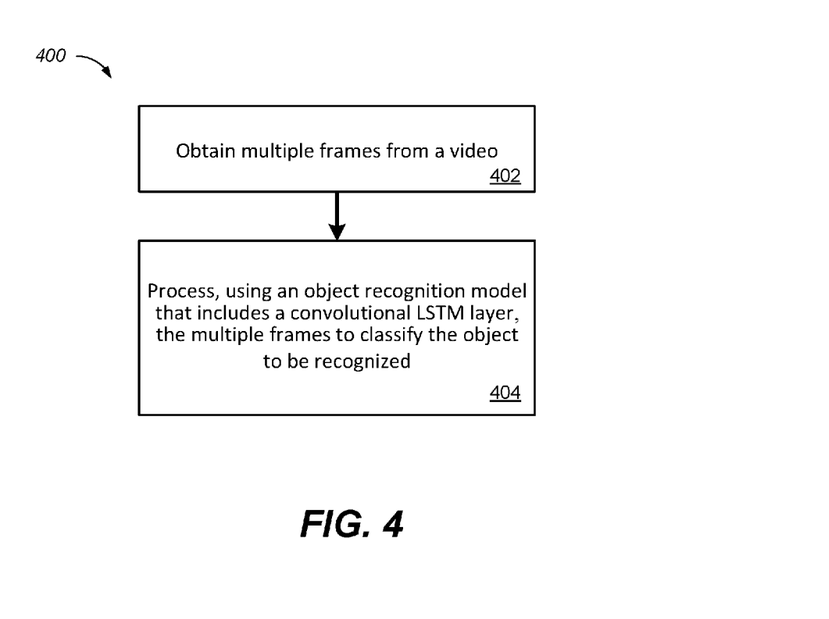
FIG. 4 is a flow diagram that illustrates an example of a process for processing an input using an object recognition model that includes convolutional LSTM layers.

FIG. 4 is a flow diagram that illustrates an example of a process 400 for processing an input using an object recognition model that includes convolutional LSTM layers. The process 400 may be performed by one or more systems, such as the system 100.

The system obtains multiple frames from a video, where each frame of the multiple frames depicts an object to be recognized (402). In some implementations, a count of the multiple frames is five or fewer. For example, a short video may include a sequence of three video frames $f_{t-1}$, $f_t$, and $f_{t+1}$ taken at time t−1, t, and t+1, respectively. In some implementations, the system may select the multiple frames from the video based on a predetermined time interval. For example, the video may be 5 seconds long, and five video frames may be selected, where each video frame is 1 second apart. In some implementations, the system may select the multiple frames from the video based on a viewpoint of the object to be recognized. For example, a camera may record a video capturing an object being rotated on a turntable by 360 degrees, and four video frames may be selected at corresponding viewpoints of 0 degree, 90 degrees, 180 degrees, and 270 degrees. In some implementations, the system may select the multiple frames from the video based on a processing capability of a processor. For example, a GPU may be capable of analyzing a two-frame sequence at 1 second per sequence, and two video frames may be selected at 1 second apart. In some implementations, the video may be a short video.

The system processes, using an object recognition model, the multiple frames to generate data that represents a classification of the object to be recognized (404). In some implementations, the object recognition model is a recurrent neural network that includes a long short-term memory (LSTM) layer. For example, the system 100 includes a forward LSTM layer 106. In some implementations, the LSTM layer includes a convolutional input gate, a convolutional forget gate, a convolutional memory block, and a convolutional output gate that use convolutions to process data. For example, the forward LSTM layer 106 may be a convolutional LSTM layer, where each of the input gate 302, the output gate 304, the forget gate 306, and the memory cell 322 is convolutional. In some implementations, the classification may include a respective score for each object category in a predetermined set of object categories, the respective score for each of the object categories representing a likelihood that the object to be recognized belongs to the object category. For example, the softmax layer of the classification layer 108 may generate posterior probabilities P(object|X), each representing a likelihood of a respective object given the current set of input data, X.

In some implementations, the recurrent neural network includes multiple feature extraction layers. For example, the system 100 includes feature extraction layers 104 that include one or more convolutional neural network (CNN) layers. In some implementations, for each frame of the multiple frames, the system may process, using the multiple feature extraction layers, the frame to generate feature data that represents features of the frame. For example, for time step t, the feature extraction layers 104 processes the video frame $f_t$ to generate a feature output $x_t$. The system may process, using the LSTM layer, the feature data to generate an LSTM output and to update an internal state of the LSTM layer. For example, the forward LSTM layer 106 processes the forward LSTM output 116a and feature output $x_t$ to generate a forward LSTM output 116b and to update the internal state of the forward LSTM layer 106.

In some implementations, the multiple frames may be arranged in an order according to their time of occurrence in the video. For example, the input 102 includes a sequence of three video frames $f_{t-1}$, $f_t$, and $f_{t+1}$ taken at time t−1, t, and t+1, respectively. The system may process each frame of the multiple frames using the LSTM layer in the order according to their time of occurrence in the video to generate the LSTM output and to update the internal state of the LSTM layer. For example, the forward LSTM layer 106 is configured to process the feature output 115 in forward time steps to generate a forward LSTM output.

In some implementations, the recurrent neural network may include one or more classification layers. For example, the system 100 includes the classification layers 108. The system may process, using the one or more classification layers, the LSTM output to generate the data that represents the classification of the object to be recognized. For example, the outputs 116a, 116b, and 116c of the forward LSTM layer 106 may be passed to the concatenation layer. The output of the concatenation layer may be passed to the one or more fully-connected DNN layers. The output of the fully-connected DNN layers may be passed to the softmax layer to generate output 120.

In some implementations, the recurrent neural network may include a backward LSTM layer. For example, a bidirectional convolutional LSTM model that includes the forward LSTM layer 106 and the backward LSTM layer 110 may be used to further improve the accuracy of object recognition models. The system may process each frame of the multiple frames using the backward LSTM layer in a reversed order according to their time of occurrence in the video to generate a backward LSTM output and to update an internal state of the backward LSTM layer. For example, the backward LSTM layer 110 is configured to process the feature output 115 in a reverse order to generate a backward LSTM output. The system may process, using the one or more classification layers, the LSTM output and the backward LSTM output to generate the data that represents the classification of the object to be recognized. For example, the outputs 118a, 118b, and 118c of the backward LSTM layer 110 may be passed to the classification layers 108 to generate output 120.

Figure 5:
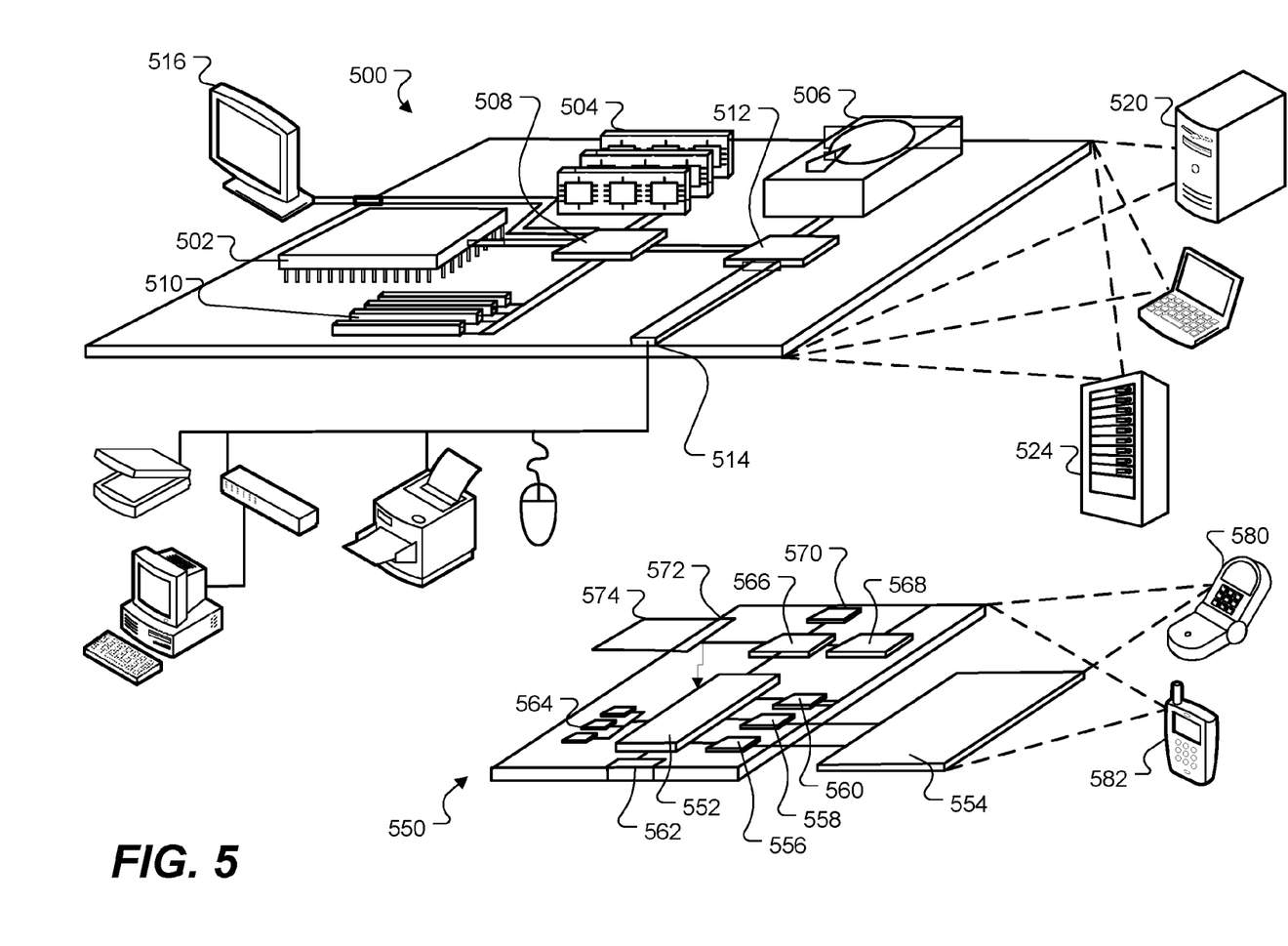
FIG. 5 is a schematic diagram that shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining multiple frames from a video, wherein each frame of the multiple frames depicts an object to be recognized; and
processing, using an object recognition model, the multiple frames to generate data that represents a classification of the object to be recognized,
wherein the object recognition model is a recurrent neural network that comprises a long short-term memory (LSTM) layer and multiple feature extraction layers,
wherein the LSTM layer includes a convolutional input gate, a convolutional forget gate, a convolutional memory block, and a convolutional output gate that use convolutions to process data, and wherein the processing comprises, for each frame of the multiple frames:
processing, using the multiple feature extraction layers, the frame to generate feature data that represents features of the frame; and
processing, using the LSTM layer, the feature data to generate an LSTM output and to update an internal state of the LSTM layer.

2. The method of claim 1,
wherein the multiple frames are arranged in an order according to their time of occurrence in the video, and
wherein processing the multiple frames further comprises processing each frame of the multiple frames using the LSTM layer in the order according to their time of occurrence in the video to generate the LSTM output and to update the internal state of the LSTM layer.

3. The method of claim 2,
wherein the recurrent neural network further comprises one or more classification layers, and
wherein processing the multiple frames further comprises processing, using the one or more classification layers, the LSTM output to generate the data that represents the classification of the object to be recognized.

4. The method of claim 3,
wherein the recurrent neural network further comprises a backward LSTM layer, and
wherein processing the plurality of frames further comprises:
processing each frame of the multiple frames using the backward LSTM layer in a reversed order according to their time of occurrence in the video to generate a backward LSTM output and to update an internal state of the backward LSTM layer, and
processing, using the one or more classification layers, the LSTM output and the backward LSTM output to generate the data that represents the classification of the object to be recognized.

5. The method of claim 1, wherein the classification includes a respective score for each object category in a predetermined set of object categories, the respective score for each of the object categories representing a likelihood that the object to be recognized belongs to the object category.

6. The method of claim 1, wherein obtaining the multiple frames from the video comprises selecting the multiple frames from the video based on a predetermined time interval.

7. The method of claim 1, wherein obtaining the multiple frames from the video comprises selecting the multiple frames from the video based on a viewpoint of the object to be recognized.

8. The method of claim 1, wherein obtaining the multiple frames from the video comprises selecting the multiple frames from the video based on a processing capability of a processor.

9. The method of claim 1, wherein obtaining the multiple frames from the video comprises obtaining the video using a camera mounted on a robotic arm manipulator.

10. The method of claim 1, wherein a count of the multiple frames is five or fewer.

11. A system comprising one or more computers and one or more storage devices storing instructions that when executed by the one or more computers cause the one or more computers to perform operations comprising:
obtaining multiple frames from a video, wherein each frame of the multiple frames depicts an object to be recognized; and
processing, using an object recognition model, the multiple frames to generate data that represents a classification of the object to be recognized,
wherein the object recognition model is a recurrent neural network that comprises a long short-term memory (LSTM) layer and multiple feature extraction layers,
wherein the LSTM layer includes a convolutional input gate, a convolutional forget gate, a convolutional memory block, and a convolutional output gate that use convolutions to process data, and wherein the processing comprises, for each frame of the multiple frames:
processing, using the multiple feature extraction layers, the frame to generate feature data that represents features of the frame; and
processing, using the LSTM layer, the feature data to generate an LSTM output and to update an internal state of the LSTM layer.

12. The system of claim 11,
wherein the multiple frames are arranged in an order according to their time of occurrence in the video, and
wherein processing the multiple frames further comprises processing each frame of the multiple frames using the LSTM layer in the order according to their time of occurrence in the video to generate the LSTM output and to update the internal state of the LSTM layer.

13. The system of claim 12,
wherein the recurrent neural network further comprises one or more classification layers, and
wherein processing the multiple frames further comprises processing, using the one or more classification layers, the LSTM output to generate the data that represents the classification of the object to be recognized.

14. The system of claim 13,
wherein the recurrent neural network further comprises a backward LSTM layer, and
wherein processing the plurality of frames further comprises:
processing each frame of the multiple frames using the backward LSTM layer in a reversed order according to their time of occurrence in the video to generate a backward LSTM output and to update an internal state of the backward LSTM layer, and
processing, using the one or more classification layers, the LSTM output and the backward LSTM output to generate the data that represents the classification of the object to be recognized.

15. The system of claim 11, wherein the classification includes a respective score for each object category in a predetermined set of object categories, the respective score for each of the object categories representing a likelihood that the object to be recognized belongs to the object category.

16. The system of claim 11, wherein obtaining the multiple frames from the video comprises selecting the multiple frames from the video based on a predetermined time interval.

17. The system of claim 11, wherein obtaining the multiple frames from the video comprises selecting the multiple frames from the video based on a viewpoint of the object to be recognized.

18. The system of claim 11, wherein obtaining the multiple frames from the video comprises selecting the multiple frames from the video based on a processing capability of a processor.

19. The system of claim 11, wherein obtaining the multiple frames from the video comprises obtaining the video using a camera mounted on a robotic arm manipulator.

20. The system of claim 11, wherein a count of the multiple frames is five or fewer.

21. A computer program product encoded on one or more non-transitory computer storage media, the computer program product comprising instructions that when executed by one or more computers cause the one or more computers to perform operations comprising:
   obtaining multiple frames from a video, wherein each frame of the multiple frames depicts an object to be recognized; and
   processing, using an object recognition model, the multiple frames to generate data that represents a classification of the object to be recognized,
      wherein the object recognition model is a recurrent neural network that comprises a long short-term memory (LSTM) layer and multiple feature extraction layers,
      wherein the LSTM layer includes a convolutional input gate, a convolutional forget gate, a convolutional memory block, and a convolutional output gate that use convolutions to process data, and wherein the processing comprises, for each frame of the multiple frames:
         processing, using the multiple feature extraction layers, the frame to generate feature data that represents features of the frame; and
         processing, using the LSTM layer, the feature data to generate an LSTM output and to update an internal state of the LSTM layer.

22. The computer program product of claim 21,
wherein the multiple frames are arranged in an order according to their time of occurrence in the video, and
wherein processing the multiple frames further comprises processing each frame of the multiple frames using the LSTM layer in the order according to their time of occurrence in the video to generate the LSTM output and to update the internal state of the LSTM layer.

23. The computer program product of claim 22,
wherein the recurrent neural network further comprises one or more classification layers, and
wherein processing the multiple frames further comprises processing, using the one or more classification layers, the LSTM output to generate the data that represents the classification of the object to be recognized.

24. The computer program product of claim 23,
wherein the recurrent neural network further comprises a backward LSTM layer, and
wherein processing the plurality of frames further comprises:
   processing each frame of the multiple frames using the backward LSTM layer in a reversed order according to their time of occurrence in the video to generate a backward LSTM output and to update an internal state of the backward LSTM layer, and
   processing, using the one or more classification layers, the LSTM output and the backward LSTM output to generate the data that represents the classification of the object to be recognized.

25. The computer program product of claim 21, wherein the classification includes a respective score for each object category in a predetermined set of object categories, the respective score for each of the object categories representing a likelihood that the object to be recognized belongs to the object category.

26. The computer program product of claim 21, wherein obtaining the multiple frames from the video comprises selecting the multiple frames from the video based on a predetermined time interval.

27. The computer program product of claim 21, wherein obtaining the multiple frames from the video comprises selecting the multiple frames from the video based on a viewpoint of the object to be recognized.

28. The computer program product of claim 21, wherein obtaining the multiple frames from the video comprises selecting the multiple frames from the video based on a processing capability of a processor.

29. The computer program product of claim 21, wherein obtaining the multiple frames from the video comprises obtaining the video using a camera mounted on a robotic arm manipulator.

30. The computer program product of claim 21, wherein a count of the multiple frames is five or fewer.

* * * * *

UNITED STATES PATENT AND TRADEMARK OFFICE
CERTIFICATE OF CORRECTION

| | |
|---|---|
| PATENT NO. | : 10,013,640 B1 |
| APPLICATION NO. | : 14/976147 |
| DATED | : July 3, 2018 |
| INVENTOR(S) | : Angelova et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 225 days.

Signed and Sealed this
Twenty-seventh Day of August, 2019

Andrei Iancu
*Director of the United States Patent and Trademark Office*